United States Patent [19]
Yasui

[11] Patent Number: 5,317,828
[45] Date of Patent: Jun. 7, 1994

[54] METHOD OF MANUFACTURING A FISHING ROD

[75] Inventor: Toshihiko Yasui, Tondabayashi, Japan

[73] Assignee: Shimano Inc., Osaka, Japan

[21] Appl. No.: 923,453

[22] Filed: Aug. 3, 1992

[30] Foreign Application Priority Data

Aug. 6, 1991 [JP] Japan .................................. 3-195674
Aug. 6, 1991 [JP] Japan .................................. 3-195675
Aug. 19, 1991 [JP] Japan .................................. 3-206627

[51] Int. Cl.$^5$ ............................................ A01K 87/00
[52] U.S. Cl. ............................................ 43/18.5
[58] Field of Search ........................... 43/18.1, 18.5

[56] References Cited

U.S. PATENT DOCUMENTS

| | | | |
|---|---|---|---|
| 3,260,010 | 7/1966 | Dubois | 43/18.5 |
| 3,416,255 | 12/1968 | Johnson | 43/18.5 |
| 4,043,074 | 8/1977 | Airhart | 43/18.5 |
| 4,133,708 | 1/1979 | Tokuno | 43/18.5 X |
| 4,870,774 | 10/1989 | Yamato | 43/18.1 X |
| 4,916,848 | 4/1990 | Childre | 43/23 |

Primary Examiner—Paula A. Bradley
Assistant Examiner—Jeanne M. Elpel
Attorney, Agent, or Firm—Dickstein, Shapiro & Morin

[57] ABSTRACT

A grip of a fishing rod has an outer layer mounted eccentrically on a core member extending from a reel seat support rearwardly toward a butt end, and an intermediate member disposed between the core member and the outer layer. The intermediate member is more elastic than the core member and less elastic than the outer layer. The core member is formed by placing and bonding together a parallel fiber type primary prepreg sheet and a parallel fiber type secondary prepreg sheet one over the other. The secondary prepreg sheet is smaller than the primary prepreg sheet axially of the core member. The primary and secondary prepreg sheets have fiber orientations crossing each other at a bias angle.

4 Claims, 7 Drawing Sheets

METHOD OF MANUFACTURING A FISHING ROD

BACKGROUND OF THE INVENTION

1. Field of the Invention

The present invention relates to a fishing rod and a method of manufacturing a core of the rod. More particularly, the invention relates to a fishing rod having an improved grip, and a method of manufacturing a core of the rod.

2. Description of the Related Art

A conventional fishing rod, particularly a lure rod, has a highly elastic outer layer formed directly on and bonded to a core member. When the angler grips the rod hard in casting a bait, the outer layer is subjected to a twisting force. Because of its eccentric formation on the core, the outer layer may fail to withstand the twisting force and become damaged.

Further, in a reel seat structure of the conventional lure rod, a trigger portion has front and rear surfaces bulging at transversely middle positions thereof. With this structure, the angler casts a bait while taking thumbing action with the trigger portion held between two fingers. The trigger portion having the above-noted shape is difficult to hold between the two fingers. These fingers tend to engage the trigger portion in an unstable way, resulting in an unreliable casting operation.

SUMMARY OF THE INVENTION

An object of the present invention is to provide a fishing rod which overcomes the disadvantages of the prior art noted above, and facilitates a casting operation.

Specifically, the invention intends to provide a fishing rod incorporating a simple modification in formation of an outer layer on a core, thereby to preclude the possibility of damage to the outer layer, and to realize a lure rod grip of improved gripping feel.

A further object of the present invention is to provide a fishing rod having a reel seat structure with an improved sectional shape of a trigger portion to facilitate a casting operation.

The above objects are fulfilled, according to the present invention, by a fishing rod comprising an outer layer mounted eccentrically on a core member extending from a reel seat support rearwardly toward a butt end, and an intermediate member disposed between the core member and the outer layer, the intermediate member being more elastic than the core member and less elastic than the outer layer.

The above construction provides the following functions and effects.

When the angler grips the rod hard, the elastic outer layer becomes deformed. However, the intermediate member which is less elastic than the outer layer receives the deforming force applied to the outer layer. This results in a reduced degree of deformation of the outer layer compared with the case of the outer layer alone being deformed without the intermediate member.

Thus, the intermediate member acts to reduce the deformation and distortion of the outer layer. Since the intermediate member is less elastic than the outer layer but more readily deformable than the core member, the intermediate member is deformed to provide a smooth transition of elastic displacement from a surface of the core member to the outer layer. As a result, the elasticity of the outer layer provides an excellent gripping touch while the intermediate member minimizes torsional stress occurring with the outer layer.

In addition, the grip of the fishing rod having an increased torsional strength is capable of smoothly receiving a gripping force when the angler grips the fishing rod hard upon a strike of a fish. This enables the angler to land a large fish efficiently.

The fishing rod according to the present invention may have a trigger portion defining a recessed finger pocket in at least a front surface thereof.

This trigger portion provides the following advantage.

When the angler grips the fishing rod and takes thumbing action with two fingers holding the trigger portion therebetween, the bulging sides of the fingers snugly fit in the finger pockets of the trigger portion. Thus, the position of the fingers is stabilized.

This stabilizes casting operations, and the fingers are not subjected to an undue reaction through frequently repeated casting operations. The rod may be controlled steadily in the course of struggle with a fish. The angler is free from fatigue and pain after holding the rod over a prolonged time.

In a further aspect of the invention, the core member includes a primary fiber reinforced resin layer and a secondary fiber reinforced resin layer placed one over the other with respective fibers extending along an axis of the fishing rod, the secondary fiber reinforced resin layer having a smaller dimension than the primary fiber reinforced resin layer axially of the fishing rod, and the primary fiber reinforced resin layer and the secondary fiber reinforced resin layer having a tubular shape with the fiber orientations crossing each other at a bias angle "alpha".

According to this construction, as shown in FIGS. 5 through 8, secondary fiber reinforced resin layer TB has a smaller dimension than primary fiber reinforced resin layers TA in a direction of axis X of the rod R. When a bending force is applied to the rod, the portions having the primary fiber reinforced resin layers TA are bent to a great degree, but the portions having the secondary fiber reinforced resin layer TB are bent only a small amount since the primary and second fiber reinforced resin layers combine to resist the bending force. Thus, the single rod R has varied degrees of strength along its axis X. Further, the fiber orientations S of the respective fiber reinforced resin layers TA and TB cross each other at the bias angle "alpha". These fibers present resistance in a twisting direction as well as a compressing direction, thereby to diminish the possibility of the resin layers becoming cracked.

In a still further aspect of the invention, there is provided a method of manufacturing a core member of a fishing rod, which comprises the steps of placing and bonding together a parallel fiber type primary prepreg sheet and a parallel fiber type secondary prepreg sheet one over the other, the secondary prepreg sheet being smaller than the primary prepreg sheet axially of an inner core member, and the primary prepreg sheet and the secondary prepreg sheet having fiber orientations crossing each other at a bias angle; winding the primary prepreg sheet and the secondary prepreg sheet as bonded together around the inner core member such that fibers thereof extend axially of the inner core member; and heat-treating the primary prepreg sheet and the secondary prepreg sheet.

This method provides the following functions and effects.

Even when a thin inner core is used in manufacturing rods, the primary and secondary prepreg sheets are wound on the inner core with no relative displacement occurring between the prepreg sheets. In addition, even when the prepreg sheets are subjected to high pressure in the course of winding process, the fibers of one prepreg sheet prevent displacement of the fibers of the other prepreg sheet. This prevents collapse of the wound prepreg sheets.

According to the present invention, the two fiber reinforced resin layers are formed. Where a tapered inner core is used in manufacture, the rod may have a varied axial strength by selecting a dimension and/or a material of the secondary fiber reinforced resin layer. There is also a reduced possibility of cracks occurring with the rod manufactured by this method. The two types of prepreg sheets placed one over the other and bonded together are wound around the inner core member with improved efficiency.

Thus, the rod manufacturing method according to the present invention does not require a change in the shape of the inner core member. This method is capable of manufacturing, through a relatively simple process, a fishing rod having desired characteristics and facilitating a casting operation.

The method according to the present invention is particularly advantageous in that the primary and secondary prepreg sheets are wound in a superposed state in a single step to simplify the winding operation compared with the case of winding the two types of prepreg sheets in separate steps.

Other features and advantages of the present invention will be apparent from the following description.

DETAILED DESCRIPTION OF THE PREFERRED EMBODIMENT

An embodiment of the present invention will be described in detail hereinafter with reference to the drawings.

Figure 2:
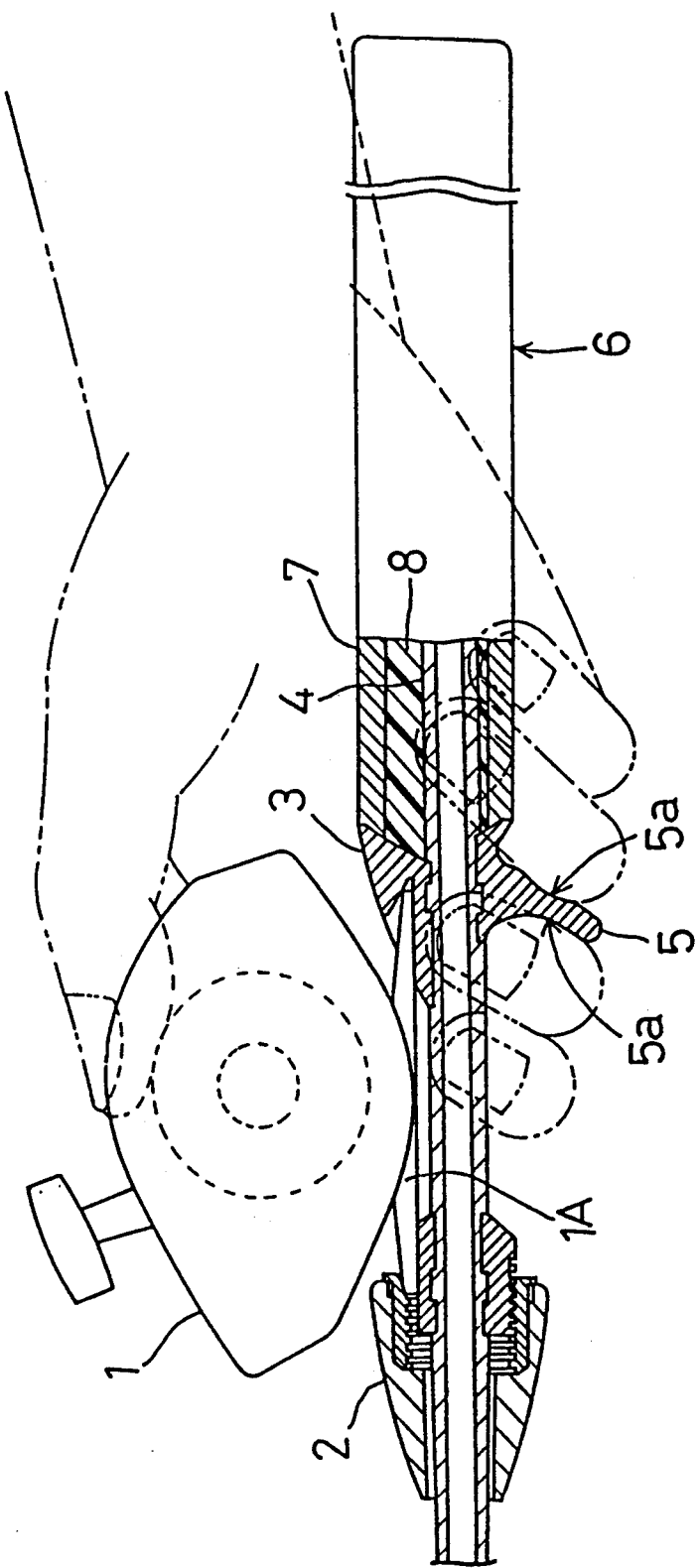
FIG. 2 is a side view in vertical section of the grip portion showing how the angler holds the grip portion and a reel.

As shown in FIG. 2, a reel 1 includes a foot 1A having a front end thereof held in place by a movable hood 2 of a lure rod, and a rear end held in place by a fixed hood 3 of the lure rod. The movable hood 2 and fixed hood 3 are mounted on a core member 4. The movable hood 2 and fixed hood 3, combined with a trigger portion 5 formed adjacent the fixed hood 3, constitute a reel seat. The lure rod further includes a grip 6 formed rearwardly of the trigger portion 5.

Figure 3:
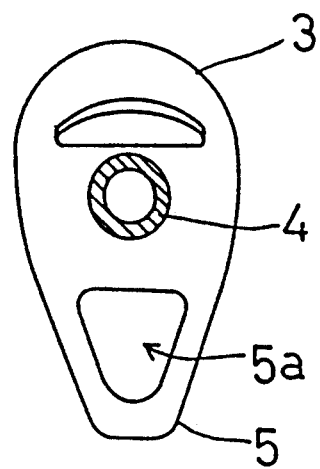
FIG. 3 is a front view in vertical section of a trigger portion.
Figure 4:
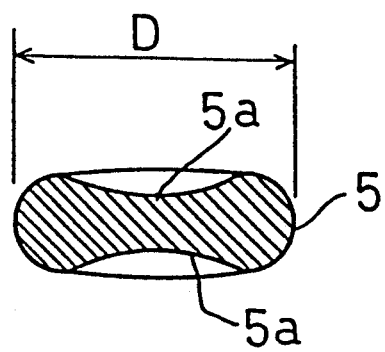
FIG. 4 is a cross section of the trigger portion.

As shown in FIGS. 3 and 4, the trigger portion 5 has a relatively large transverse width D (about 14 to 16 millimeters). The trigger portion 5 has front and rear surfaces defining recessed finger pockets 5a in transversely intermediate regions thereof, respectively. These finger pockets 5a have a maximum depth of 0.5 to 1.0 millimeter.

Figure 1:
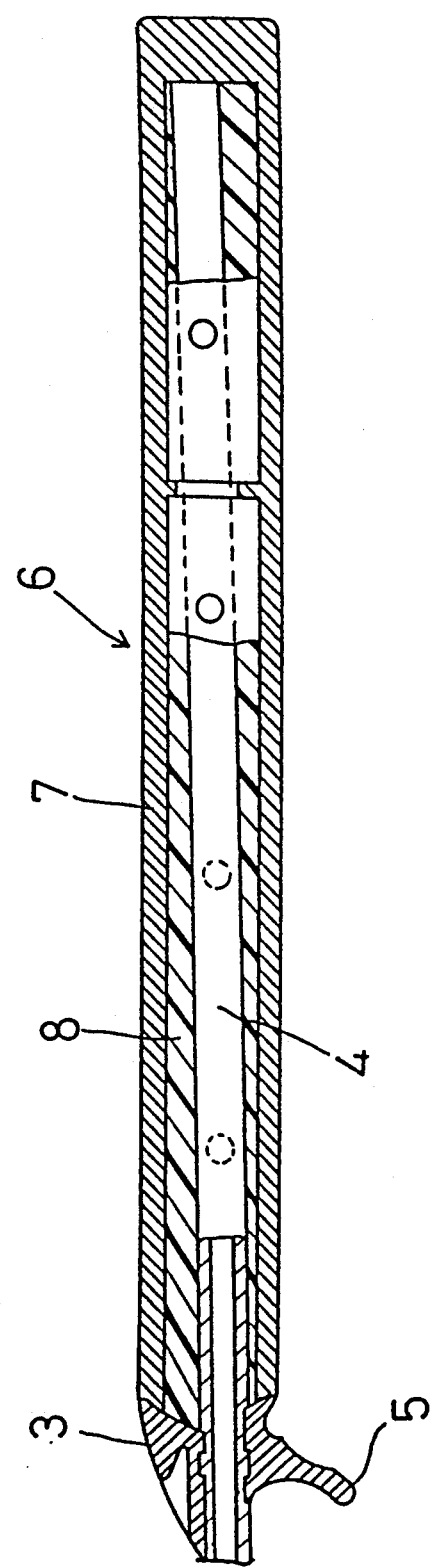
FIG. 1 is a side view in vertical section of a grip portion of a fishing rod.

As shown in FIG. 1, the angler casts a bait while taking thumbing action with the trigger portion 5 held between his or her second and third fingers. The trigger portion 5 having the above construction gives no pain to the fingers holding the trigger portion 5 therebetween. In addition, the trigger portion 5 recessed in the intermediate position and with a large width has an improved mechanical strength.

The structure of the grip 6 will be described next. As shown in FIG. 1, a cork outer layer 7 is mounted on the core member 4 extending rearwardly of the trigger portion 5 toward a butt end of the rod. As seen, the outer layer 7 is displaced with respect to an axis of the core member 4. A plastic intermediate member 8 is disposed between the core member 4 and outer layer 7. Where the intermediate member 8 is formed of a plastic more elastic than the core member 4 and less elastic than the outer layer 7, the grip 6 has an enhanced torsional strength despite the eccentricity of the outer layer 7. Thus, the outer layer 7 has little chance of being damaged when gripped hard at a bait casting time. Particularly where an eccentric thick wall portion is aligned to a reel supporting surface, the grip 6 may be gripped hard for landing a large fish. On the other hand, the angler casts a bait with the reel 1 slightly inclined sideways. At this time, the thick wall portion exerts its weight in a casting direction, thereby to facilitate the bait casting operation. When maneuvering for a strike following the bait casting operation, the reel 1 and rod may be controlled in a balanced manner to realize a subtle luring operation.

The foregoing embodiment may be modified as follows:

(1) The intermediate member 8 may be formed of a material such as hard rubber which is equivalent in elasticity to the plastic.

(2) The outer layer 7 may be formed of a plastic comparable in elasticity to cork.

(3) The outer layer 7 may have a plastic coating or the like to act as an antislip device.

(4) The trigger portion 5 may include a recessed finger pocket 5a only in the front surface thereof.

The core member used in the foregoing embodiment will be described next.

Figure 5:
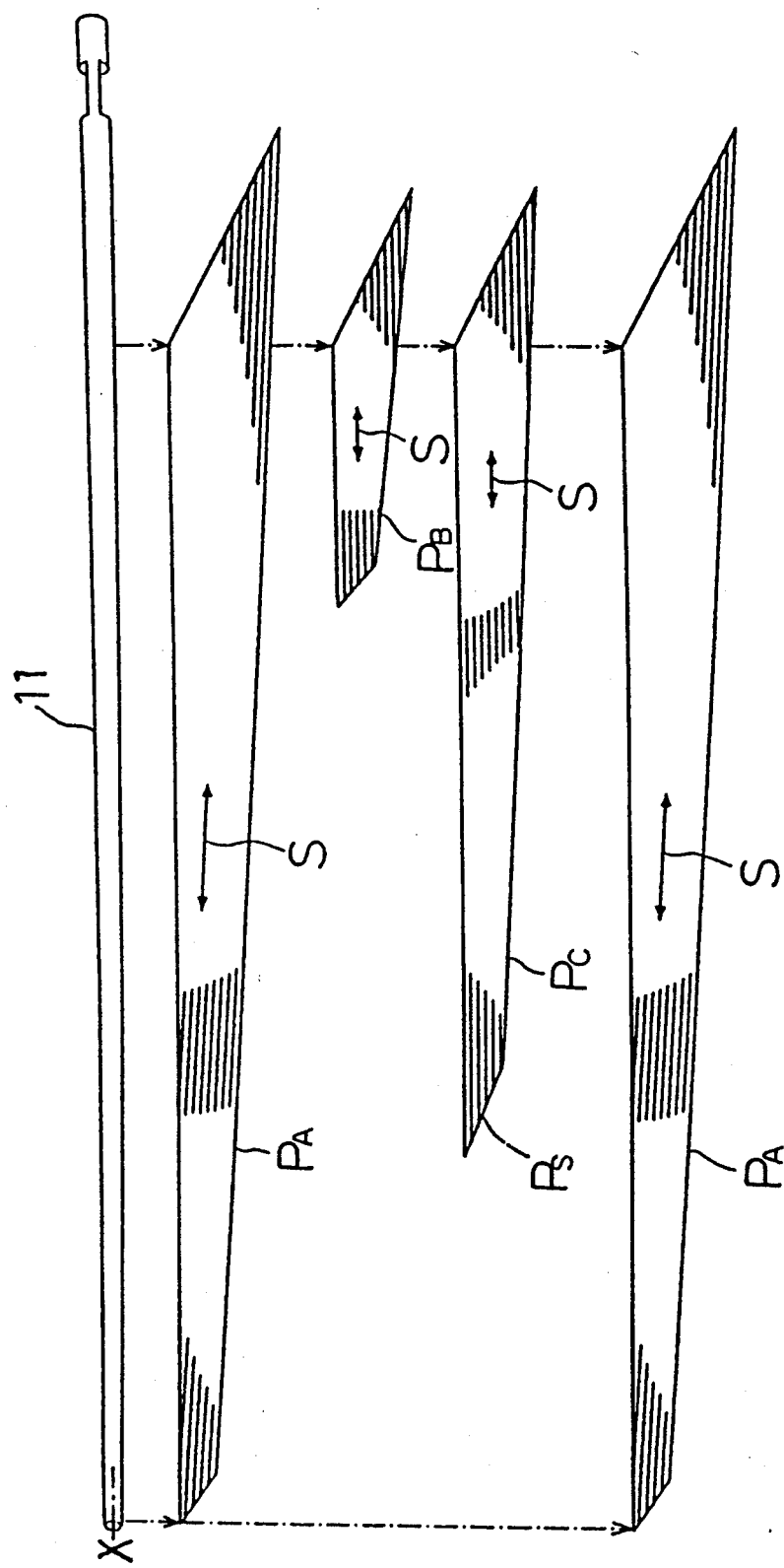
FIG. 5 is a perspective view of a mandrel and prepreg sheets.

Two primary prepreg sheets PA of the parallel fiber type are cut to a shape as shown in FIG. 5. These prepreg sheets PA have carbon fibers oriented in a direction S substantially parallel to an axis X of a mandrel 11 (one example of inner core). These carbon fibers are impregnated with a thermosetting resin such as epoxy resin.

Figure 6:
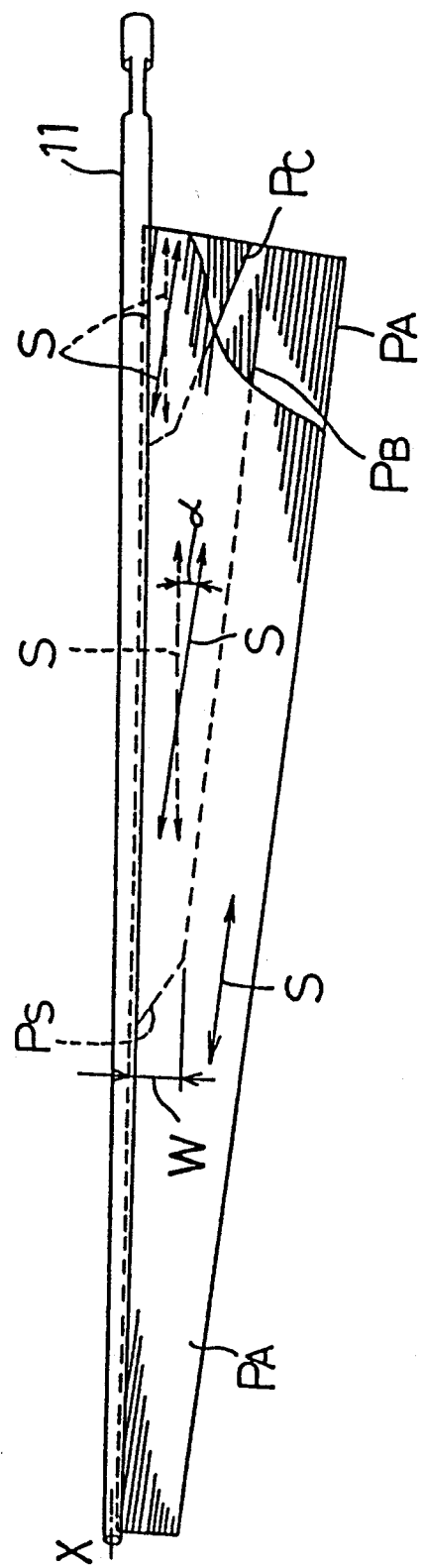
FIG. 6 is a plan view of the mandrel and prepreg sheets, FIG. 7 a perspective view showing prepreg sheets wound around the mandrel, and FIGS. 8(a) and (b) are a fragmentary side view and sectional view of the fishing rod.

Then, a secondary prepreg sheet PB of the parellel fiber type is cut to a shape as shown in FIG. 5, which is smaller than the primary prepreg sheets PA in the direction of axis X of the mandrel 11. The secondary prepreg sheet PB also has fibers oriented in a direction S. When combined with the primary prepreg sheets PA, the secondary prepreg sheet PB has the fibers crossing those of the primary prepreg sheets PA at a bias angle "alpha" as shown in FIG. 6.

The secondary prepreg sheet PB has a width W at a forward end thereof which corresponds to a circumference of the mandrel 11. This forward end is cut obliquely to define an inclined edge PS for stress distribution. The secondary prepreg sheet PB is bonded to each of the primary prepreg sheets PA, with respective rearward positions and side edges placed in register.

In this rod manufacturing method, a supplementary prepreg sheet PC having the same fiber orientation as the primary prepreg sheets PA is bonded to the secondary prepreg sheets PB, with respective rearward positions and side edges placed in register. The supplementary prepreg sheet PC is used to determine condition of the rod and to promote strength of a butt end region of the rod. The secondary and supplementary prepreg sheets PB and PC are sandwiched between the two primary prepreg sheets PA.

Figure 7:
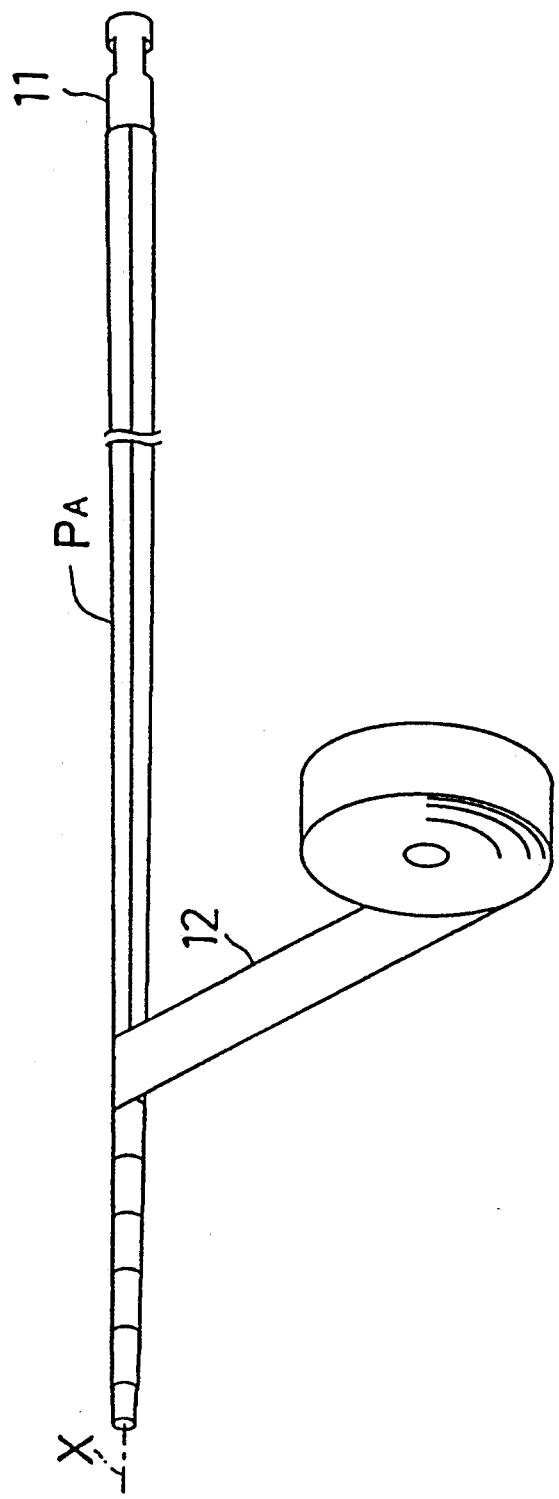

Subsequently, as shown in FIG. 7, the prepreg sheets assembled as noted above are wound around the mandrel 11, with the fiber orientations S of the respective prepreg sheets PA and PB set with reference to the axis X of the mandrel 11. Then, a heat shrink tape 12 is wound around the prepreg assembly. The prepreg assembly and tape 12 are heat-treated at a predetermined temperature. The tape 12 is removed and the mandrel 11 withdrawn to obtain a tubular product. This tubular product is cut at opposite ends, and its surface is treated, e.g. painted and polished, thereby to become a fishing rod R.

Figure 8A:
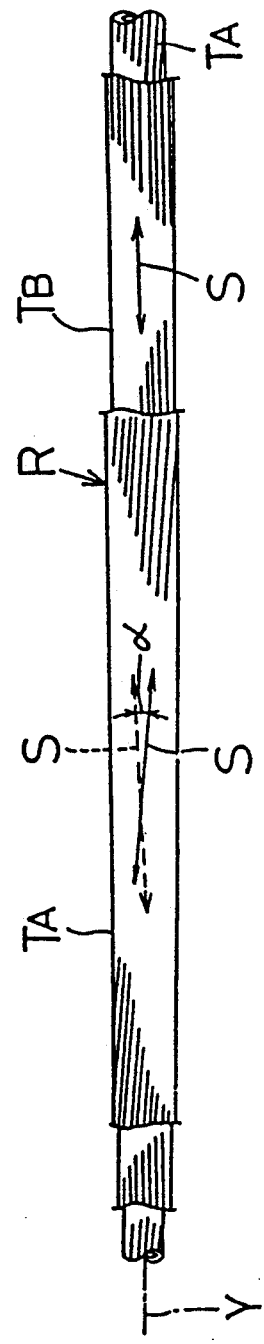

As shown in FIGS. 8(a) and (b), the rod R manufactured as above has primary fiber reinforced resin layers TA and a secondary fiber reinforced resin layer TB formed in superposition, with the fiber orientations S following an axis x of the rod R. The fiber orientations S of the primary fiber reinforced resin layers TA and secondary fiber reinforced resin layer TB cross each other at the bias angle "alpha". The rod R has a forward portion flexible to a great extent under a relatively light load, and a butt end portion which is hardly flexible.

Figure 8B:
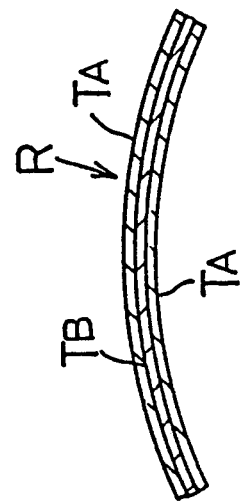

FIG. 8(b) shows the primary fiber reinforced resin layers TA and secondary fiber reinforced resin layer TB as distinct from each other. These layers TA and TB are actually fused together through the heat treating process noted above.

According to the present invention, the tape and each prepreg sheet may be wound in a single ply or in a plurality of plies on the inner core member. The invention is applicable to a butt end section as well as a tip rod section and a second rod section of a fishing rod. The rod according to the present invention may have only one primary prepreg sheet and only one secondary prepreg sheet wound.

The primary and secondary prepreg sheets may be bonded to each other by using an adhesive or by using viscosity of the prepreg sheets per se.

What is claimed is:

1. A method of manufacturing a fishing rod comprising the steps of:

placing a parallel fiber first primary prepreg sheet over a parallel fiber secondary prepreg sheet having a longitudinal length shorter than that of said first primary prepreg sheet and bonding said first primary prepreg sheet and said secondary prepreg sheet together so as to prepare a multi-layer sheet in which respective fiber orientations of said first primary prepreg sheet and said secondary prepreg sheet cross each other at a predetermined bias angle and said first primary prepreg sheet and said secondary prepreg sheet are placed in register with each other with respect to base ends and side edges thereof, respectively;

winding one or a plurality of said multi-layer sheets around a longitudinally extending inner core member such that said fiber orientations of said first primary prepreg sheet and said secondary prepreg sheet extend substantially axially of said inner core member; and heat-treating said wound multi-layer sheet.

2. A method according to claim 1 further comprising the step of:

after said step of placing said first primary prepreg sheet over said secondary prepreg sheet to form said multi-layer sheet, placing in surface contact with said secondary prepreg sheet of said multi-layer sheet a parallel fiber supplementary prepreg sheet having a longitudinal length shorter than that of said secondary prepreg sheet and bonding said multi-layer sheet and said supplementary prepreg sheet together so that respective fiber orientations of said first primary prepreg sheet and said supplementary prepreg sheet are aligned in parallel with each other and are placed in register with each other with respect to base ends and side edges thereof, respectively.

3. A method according to claim 2, further comprising the step of:

after said step of bonding said multi-layer sheet and said supplementary prepreg sheet together, placing in surface contact with said supplementary prepreg sheet of said multi-layer sheet a parallel fiber second primary prepreg sheet having the same longitudinal length as that of said first primary prepreg sheet and bonding said multi-layer sheet and said second primary prepreg sheet together so that respective fiber orientations of said second primary prepreg sheet and said supplementary prepreg sheet are aligned in parallel with each other and are placed in register with each other with respect to base ends and side edges thereof, respectively.

4. A method of manufacturing a fishing rod comprising the steps of:

placing a parallel fiber first primary prepreg sheet, a parallel fiber secondary prepreg sheet having a longitudinal length shorter than said first primary prepreg sheet, a parallel fiber supplementary prepreg sheet having a longitudinal length shorter than that of said secondary prepreg sheet and a parallel fiber second primary prepreg sheet having the same longitudinal length as that of said first primary prepreg sheet one over the other and bonding them together so as to prepare a multi-layer sheet in which respective fiber orientations of adjacently placed prepreg sheets cross at a predetermined bias angle and in which said first primary prepreg sheet and said second primary prepreg sheet bind therebetween said secondary prepreg sheet and said supplementary prepreg sheet, and said first primary prepreg sheet, said secondary prepreg sheet, said supplementary prepreg sheet and said second primary prepreg sheet are placed in register with each other with respect to base ends and side edges thereof, respectively;

winding one or a plurality of said multi-layer sheets around a longitudinally extending inner core member such that said orientations of said first primary prepreg sheet, said secondary prepreg sheet, said supplementary prepreg sheet and said second primary prepreg sheet extend substantially axially of said inner core member; and heat-treating said wound multi-layer sheet.

* * * * *